(12) United States Patent
Nakano et al.

(10) Patent No.: US 10,897,547 B2
(45) Date of Patent: Jan. 19, 2021

(54) MULTI-FUNCTION PRINTER

(71) Applicant: SEIKO EPSON CORPORATION, Tokyo (JP)

(72) Inventors: Yosuke Nakano, Matsumoto (JP); Atsuhiko Takeuchi, Matsumoto (JP); Hitoshi Igarashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/820,775

(22) Filed: Mar. 17, 2020

(65) Prior Publication Data

US 2020/0304649 A1 Sep. 24, 2020

(30) Foreign Application Priority Data

Mar. 20, 2019 (JP) ................................ 2019-052436

(51) Int. Cl.
*H04N 1/00* (2006.01)
(52) U.S. Cl.
CPC ................................ *H04N 1/0057* (2013.01)
(58) Field of Classification Search
CPC .................................................. H04N 1/0057
See application file for complete search history.

(56) References Cited

U.S. PATENT DOCUMENTS

2002/0060817 A1* 5/2002 Okada ...................... B41J 11/42
358/505
2008/0112021 A1* 5/2008 Katsuyama .............. H04N 1/12
358/498

FOREIGN PATENT DOCUMENTS

JP 2015-151225 A 8/2015

* cited by examiner

*Primary Examiner* — Quang N Vo
(74) *Attorney, Agent, or Firm* — Workman Nydegger

(57) ABSTRACT

Provided is a multi-function printer including a driving roller provided in a read transport path including a paper feeding port and a paper discharging port, the driving roller being configured to transport paper, another driving roller provided in a transport path, the other driving roller being configured to transport paper, a reading unit configured to read a surface of the paper transported by the driving roller, a printing unit configured to perform printing onto the paper being transported by the other driving roller, a read controller configured to control the driving roller and the reading unit, and a print controller configured to control the other driving roller and the printing unit. The driving roller, the paper feeding port, the paper discharging port, and the reading unit are disposed in a downstream of the printing unit in a transport direction at a position of printing by the printing unit.

6 Claims, 5 Drawing Sheets

MULTI-FUNCTION PRINTER

The present application is based on, and claims priority from JP Application Serial Number 2019-052436, filed Mar. 20, 2019, the disclosure of which is hereby incorporated by reference herein in its entirety.

BACKGROUND

1. Technical Field

The present disclosure relates to a multi-function printer.

2. Related Art

An image forming apparatus (multi-function printer) including a scanner unit configured to read a medium and a printer unit configured to perform printing onto a medium, where the image forming apparatus is configured such that the feed discharge paths for medium are reliably ensured without the paths interfering with each other while each of the scanner unit and the printer unit is in use, is disclosed in JP 2015-151225 A.

Unfortunately, the multi-function printer described in JP 2015-151225 A has an issue in that, when performing maintenance on the printer, the convenience of the user is reduced due to the scanner unit being disposed vertically above the printer unit.

SUMMARY

A multi-function printer of the present disclosure includes a first transport roller provided in a path including a paper feeding port and a paper discharging port, the first transport roller being configured to transport a first medium, a second transport roller provided in a path different from the path provided with the first transport roller, the second transport roller being configured to transport a second medium, a reading unit configured to read a surface of the first medium that is being transported by the first transport roller, a printing unit configured to perform printing onto the second medium that is transported by the second transport roller, a read controller configured to control the first transport roller and the reading unit, and a print controller configured to control the second transport roller and the printing unit, in which the first transport roller, the paper feeding port, the paper discharging port, and the reading unit are disposed in a downstream direction from the printing unit in a transport direction at a position of printing by the printing unit.

The above-described multi-function printer may include a roll support section configured to support a roll, around which the second medium to be fed to the printing unit is wound, in which the roll support section may be disposed in the downstream direction from the printing unit in the transport direction and vertically below the reading unit.

In the above-described multi-function printer, the print controller may be disposed in a direction upstream of the roll support section in the transport direction and vertically below the printing unit.

The above-described multi-function printer may include a drawer unit configured to enable the roll support section to move in the transport direction, in which the drawer unit may be configured to be movable between a close position at which the roll support section is located vertically below the reading unit and an open position at which the roll support section is located in a downstream direction from the reading unit in the transport direction.

In the above-described multi-function printer, the read controller may be disposed between the paper feeding port and the paper discharging port in a read transport direction at a position of reading by the reading unit.

The above-described multi-function printer may include a cover in a direction upstream of the reading unit in the read transport direction and vertically above the position of printing by the printing unit, in which the cover may be configured to be rotatable about an upstream end thereof, which serves as a rotation axis, in the read transport direction.

DESCRIPTION OF EXEMPLARY EMBODIMENTS

Figure 1:
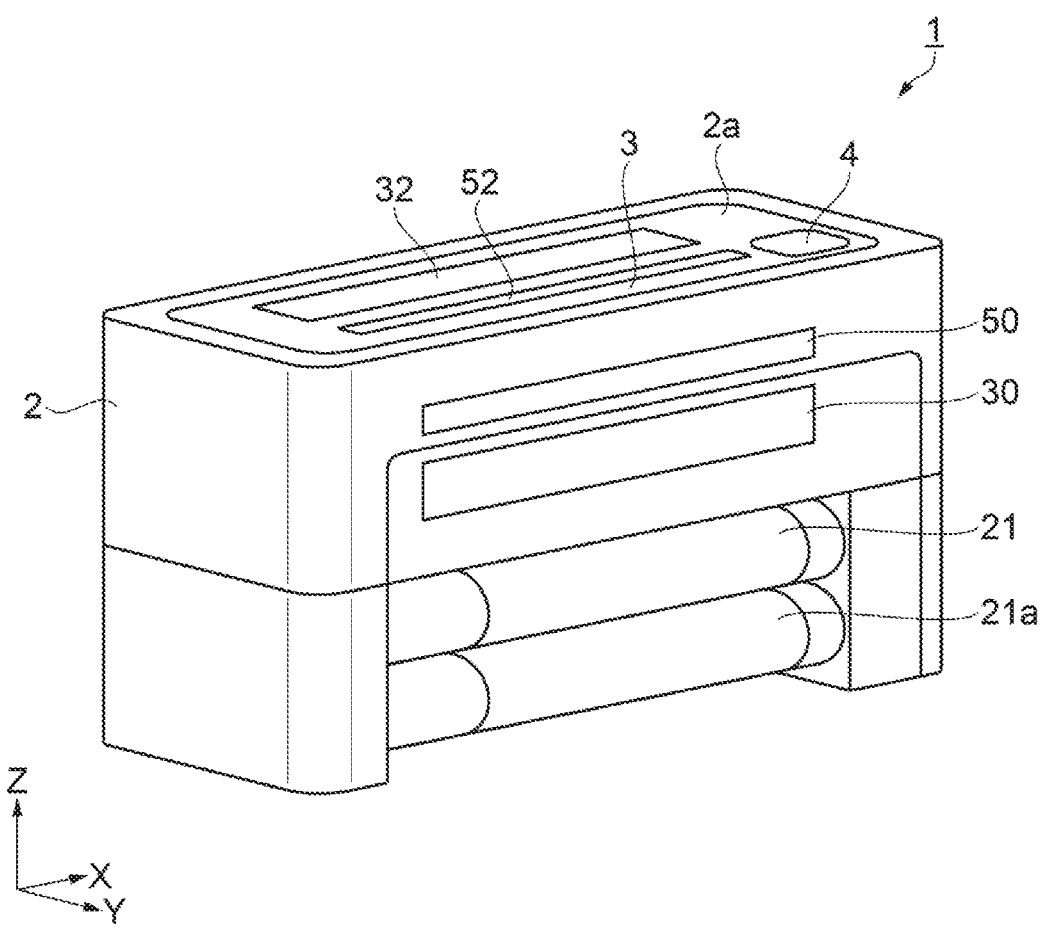
FIG. 1 is a perspective view illustrating a multi-function printer according to the embodiment.

Hereinafter, a multi-function printer 1 according to the embodiment will be described with reference to the accompanying drawings.

Note that the corresponding constituent elements in each of the drawings are denoted by the same reference signs, and their redundant descriptions will not be given.

In addition, in the drawings referred to in the description below, for convenience of explanation and illustration, the scale of the vertical and horizontal dimensions of the members or portions is occasionally expressed as different from the actual scale. Further, constituent elements other than the constituent elements needed for the description are occasionally be omitted.

Further, in the following, for convenience of explanation, X, Y, and Z axes are indicated as three axes orthogonal to one another, and the leading end side of the arrows indicating each of the axes is designated as "+", while the base end side is designated as "−". Further, the direction along the X axis is referred to as "width direction", the direction along the Y axis is referred to as "front-back direction", and the direction along the Z axis is referred to as "vertical direction". In addition, description will be given in such a way that the +X direction in the width direction is defined as right or right side, the −X direction is defined as left or left side, the +Y direction in the front-back direction is defined as front or front side, the −Y direction is defined as back or back side, the +Z direction in the vertical direction is defined as above or vertically above, and the −Z direction is defined as below or vertically below.

Figure 2:
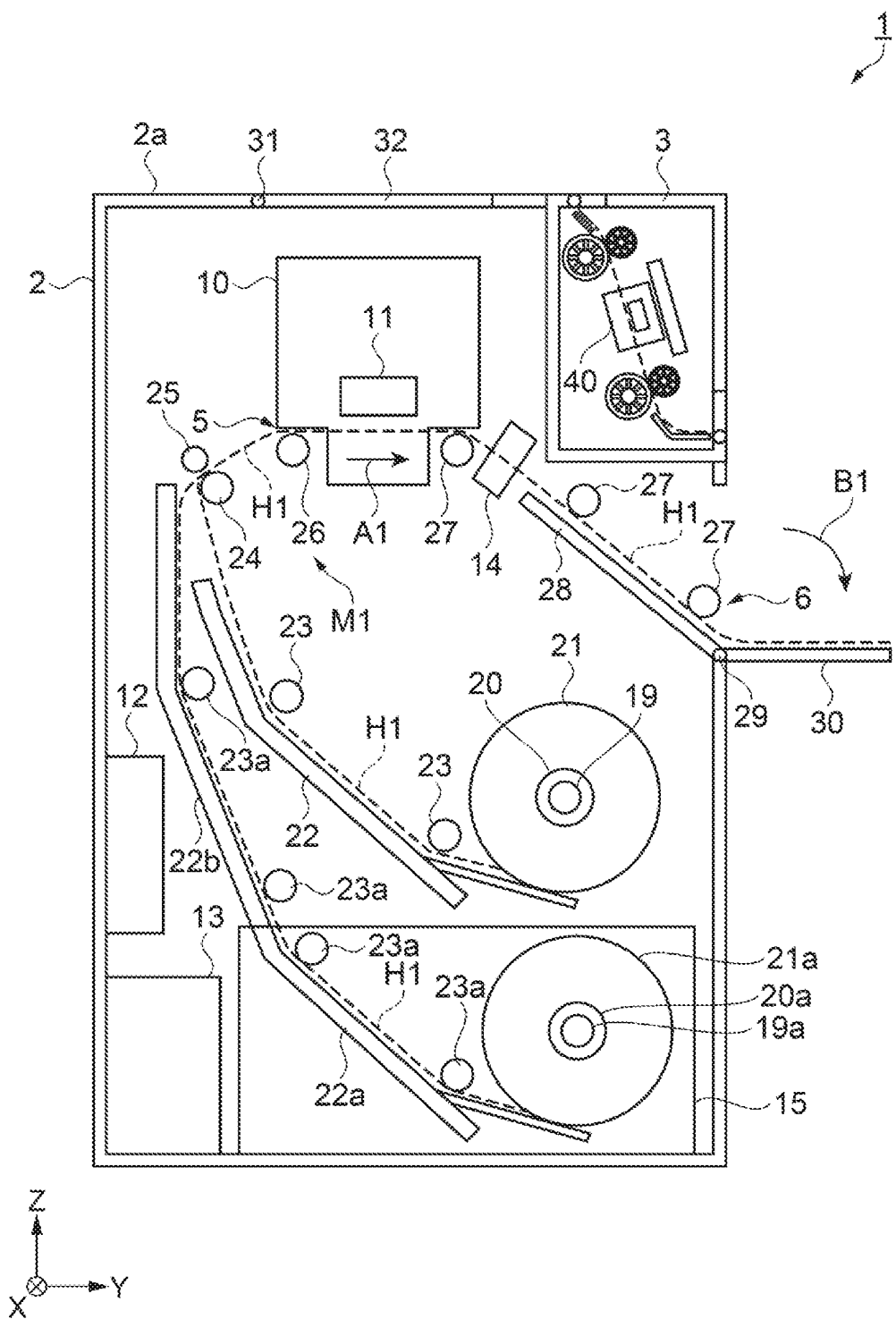
FIG. 2 is a cross-sectional view schematically illustrating a configuration of a multi-function printer.
Figure 3:
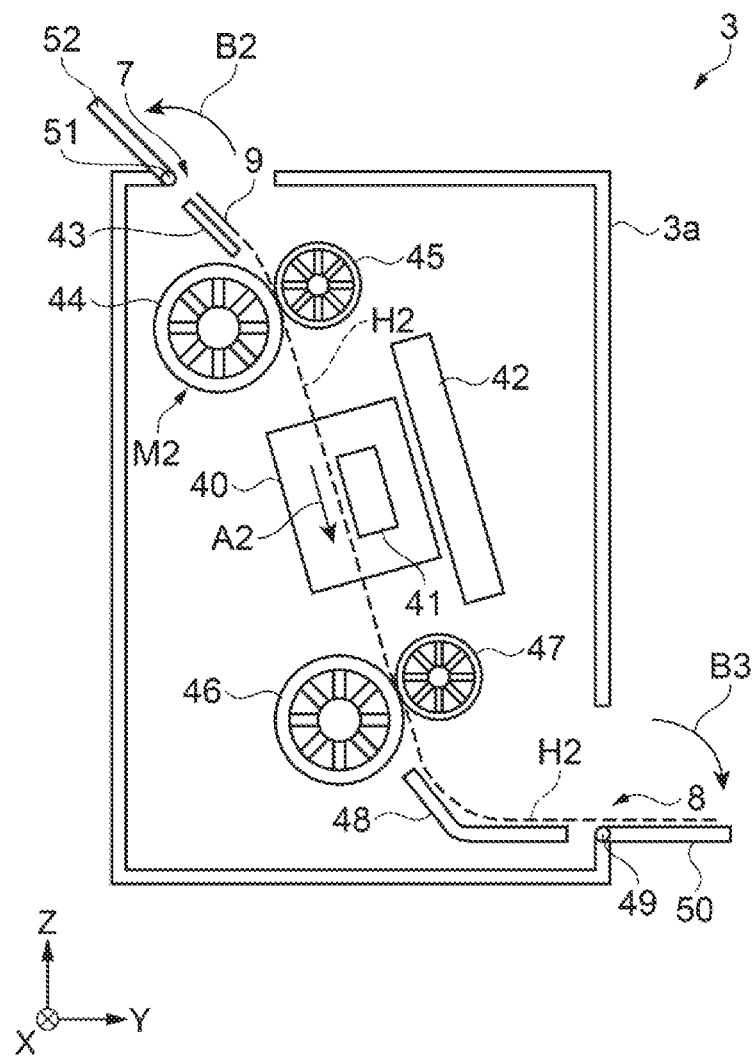
FIG. 3 is a cross-sectional view schematically illustrating a configuration of a reading device.
Figure 4:
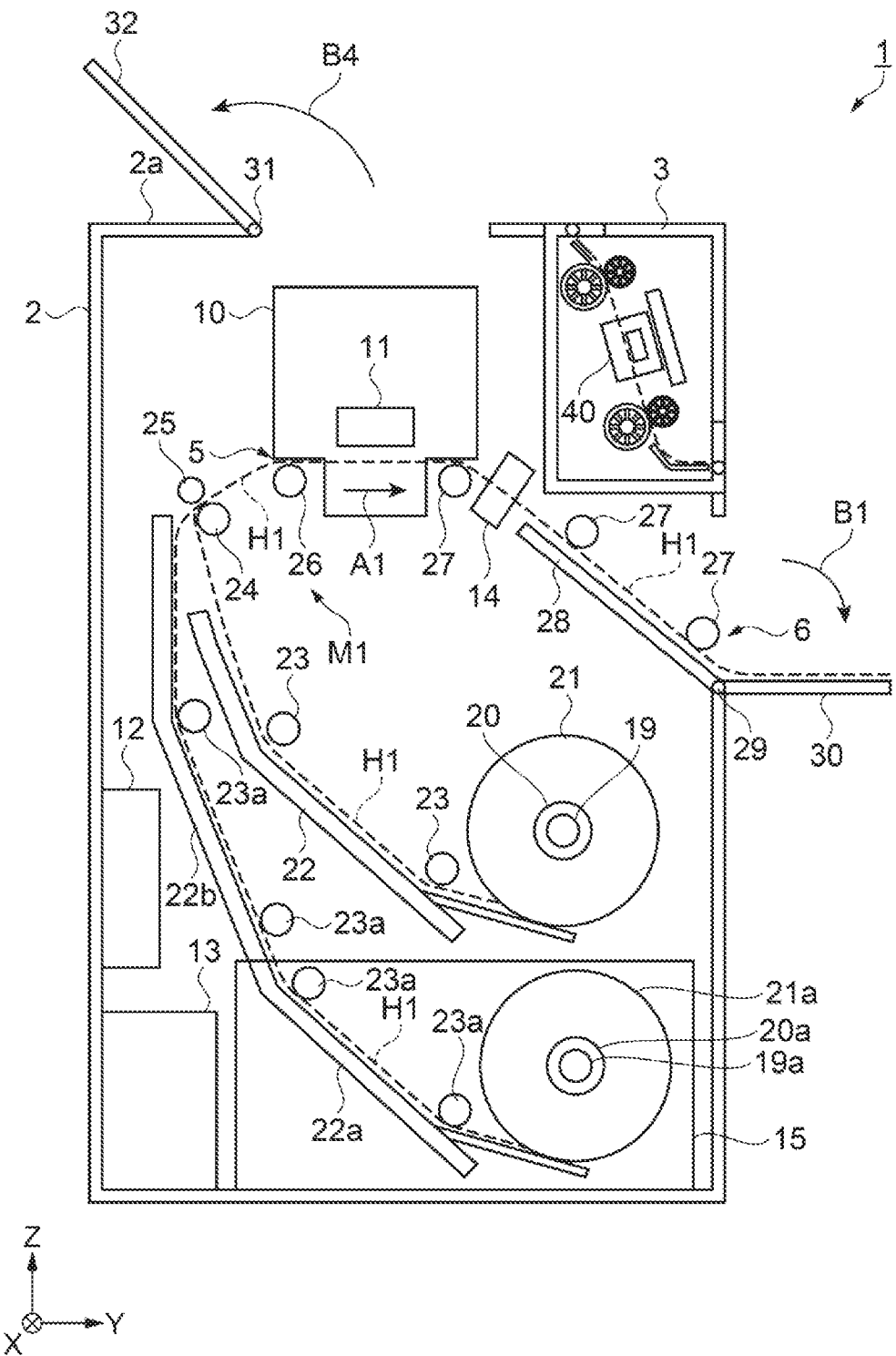
FIG. 4 is a cross-sectional view schematically illustrating opening and closing of a cover.
Figure 5:
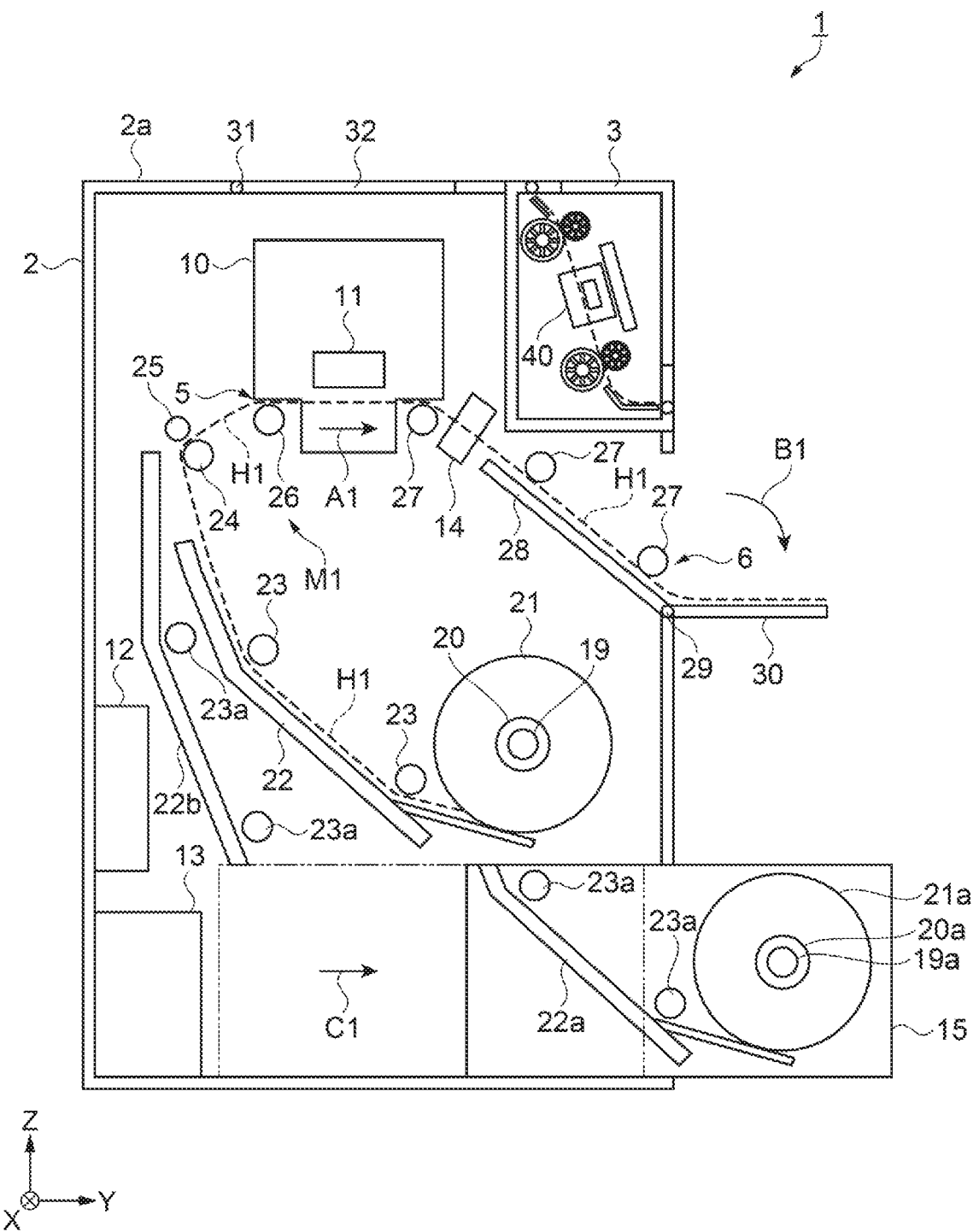
FIG. 5 is a cross-sectional view schematically illustrating operation of a drawer unit.

FIG. 1 is a perspective view illustrating the multi-function printer 1 according to the embodiment. FIG. 2 is a cross-sectional view schematically illustrating the configuration of the multi-function printer 1. FIG. 3 is a cross-sectional view schematically illustrating the configuration of the reading device 3. FIG. 4 is a cross-sectional view schematically illustrating opening and closing of a cover 32. FIG. 5 is a cross-sectional view schematically illustrating operation of a drawer unit 15.

As illustrated in FIGS. 1 to 3, the multi-function printer 1 according to the embodiment is configured as a multi-function apparatus including a printing device 2 having printing function and a reading device 3 having reading function. Note that the reading device 3 constituting the multi-function printer 1 is disposed vertically above the front side of the printing device 2. An operation unit 4 for operating the multi-function printer 1 is disposed at the right end portion of an upper surface 2a of the printing device 2. In addition, roll support sections 19 and 19a configured to support rolls 20 and 20a around which roll papers 21 and 21a as second media are wound are disposed vertically below the reading device 3.

As illustrated in FIG. 3, the reading device 3 is configured to include a reading unit 40 configured to read the surface of a paper 9 being a first medium, a read transport mechanism M2 configured to transport the paper 9 from a paper feeding port 7 to the reading unit 40 and to transport the paper 9 having been read to a paper discharging port 8, and a read controller 42 configured to control the reading unit 40 and the read transport mechanism M2.

The read transport mechanism M2 is configured by a guide plate 43, a driving roller 44, a driven roller 45, a driving roller 46 as a first transport roller, a driven roller 47, a guide plate 48, and the like.

The reading unit 40 and the read controller 42 are disposed between the driving roller 44 and the driven roller 45, and the driving roller 46 and the driven roller 47. Accordingly, the driving roller 44 and the driven roller 45 operate as paper feed rollers for feeding a paper to the reading unit 40, and the driving roller 46 and the driven roller 47 operate as paper discharge rollers for discharging the paper from the reading unit 40.

The paper 9 fed from the paper feeding port 7 is transported, via the guide plate 43, the driving roller 44, and the driven roller 45, to the reading unit 40. Thereafter, characters and pictures printed on the surface of the paper 9 are read by a contact image sensor (CIS) module 41 provided at the reading position of the reading unit 40, and are stored as image data in the memory of the read controller 42. The paper 9 having been read is transported, via the driving roller 46, the driven roller 47, and the guide plate 48, to the paper discharging port 8. This allows the paper 9 fed from the paper feeding port 7 to be transported along a read transport path H2 serving as the route.

Further, a read transport direction at the reading position of the reading unit 40 is the direction indicated by an arrow A2, that is, the direction from the paper feeding port 7 toward the paper discharging port 8, where the read controller 42 is arranged between the paper feeding port 7 and the paper discharging port 8 in the read transport direction. The read controller 42 is incorporated into the reading device 3 to thus make it possible to miniaturize the reading device 3.

In addition, a read paper cover 52 configured to be rotatable in the direction of an arrow B2 is provided about an upstream end, serving as a rotation axis 51, in the read transport direction, in the upstream direction from the reading unit 40 in the read transport direction. Accordingly, when the reading operation is not performed, closing the read paper cover 52 prevents dust or debris from entering into the reading unit 40. Note that in the embodiment, the read paper cover 52 is configured to be rotatable in the direction of the arrow B2, however, the read paper cover 52 may be configured to be rotatable in the direction opposite to the arrow B2, without being limited to the above. Even such a configuration prevents dust and debris from entering into the reading unit 40.

Further, a read discharge paper cover 50 configured to be rotatable in the direction of an arrow B3 is provided about a vertical lower end, serving as a rotation axis 49, in the read transport direction, in the downstream direction from the reading unit 40. Accordingly, opening the read discharge paper cover 50 enables the paper 9 having been read to be placed on the read discharge paper cover 50, and this facilitates the recycling of the paper 9 having been read. In addition, when the reading operation is not performed, closing the read discharge paper cover 50 prevents entry of dust or debris, and allows a front face 3a of the reading device 3 to be rendered flat, thus making it possible to miniaturize the reading device 3.

As illustrated in FIG. 2, the printing device 2 includes a printing unit 10 configured to perform printing onto the roll papers 21 and 21a, a transport mechanism M1 configured to feed the roll papers 21 and 21a to the printing unit 10 and to transport the roll papers 21 and 21a having been printed to a paper discharging port 6, a cutter 14 configured to cut the printed roll papers 21 and 21a having been printed, roll support sections 19 and 19a configured to support the rolls 20 and 20a around which the roll papers 21 and 21a are wound, a print controller 12 configured to control the printing unit 10 and the transport mechanism M1, and a power supply unit 13 configured to supply electricity to the print controller 12 and the transport mechanism M1. Note that the power supply unit 13 is also configured to supply electricity to the read controller 42 and the read transport mechanism M2.

The transport mechanism M1 is configured to transport two pieces of the roll papers 21 and 21a, and is configured by a plurality of guide plates 22, 22a, and 22b, a plurality of driving rollers 23 and 23a, a driving roller 24, a driven roller 25, a driving roller 26 being a second transport roller, a plurality of driving rollers 27, a guide plate 28, and the like.

The roll paper 21 located at the upper stage of the two roll papers 21 and 21a is transported, via the guide plate 22 and the plurality of driving rollers 23, to the printing unit 10, while the roll paper 21a located at the lower stage is transported, via the guide plates 22a and 22b and a plurality of driving rollers 23a, to the printing unit 10.

Further, the driving rollers 23 and 23a, the driving roller 24, the driven roller 25, and the driving roller 26 operate as paper feed rollers for feeding the roll papers 21 and 21a to the printing unit 10, and the plurality of driving rollers 27 operates as paper discharge rollers for discharging the roll papers 21 and 21a from the printing unit 10. Thus, the printing unit 10 is disposed between the paper feed rollers and the paper discharge rollers.

In addition, the driving roller 46, the paper feeding port 7, the paper discharging port 8, and the reading unit 40 that are described above are disposed in the downstream direction from the printing unit 10 in a transport direction at the printing position of the printing unit 10. Accordingly, no configuration member configuring the reading device 3 is disposed vertically above the printing unit 10, and thus the cover 32 that will be described below can be provided vertically above the printing unit 10, and opening and closing the cover 32 enhances the convenience of the user when performing maintenance on the printing unit 10.

The roll papers 21 and 21a fed from a paper feeding port 5 is transported, via the driving roller 26, to the printing unit 10. Thereafter, the roll papers 21 and 21a is printed with characters and pictures by a liquid discharge head 11 provided at the printing position of the printing unit 10. The roll papers 21 and 21a having been printed is cut by the cutter 14, and is transported, via the driving roller 27 and the guide plate 28, to the paper discharging port 6. Thus, the roll papers 21 and 21a fed from the paper feeding port 5 can be transported along the transport path H1 serving as the route.

In addition, the transport direction at the printing position of the printing unit 10 is the direction indicated by an arrow A1, that is, the direction from the paper feeding port 5 toward the paper discharging port 6. The two pieces of the roll support sections 19 and 19a configured to support the rolls 20 and 20a around which the two pieces of the roll papers 21 and 21a are wound are disposed in the downstream direction from the printing unit 10 in the transport direction and vertically below the reading unit 40 of the reading device 3, where the roll support section 19 is disposed vertically above the roll support section 19a, and the roll support section 19a is disposed vertically below the roll support section 19. This makes it possible to shorten the size in the front-back direction, which coincides with the transport direction of the printing device 2, making it possible to miniaturize the multi-function printer 1 provided with the printing device 2.

Further, the print controller 12 is disposed in the upstream direction from the roll support sections 19 and 19a in the transport direction and vertically below the printing unit 10. This ensures a space constituting the transport path H1 to the printing unit 10 of the roll papers 21 and 21a, making it possible to miniaturize the multi-function printer 1 provided with the printing device 2.

Further, on the upper surface 2a of the printing device 2, the cover 32 for the maintenance of the printing unit 10 is provided about an upstream end, serving as a rotation axis 31, in the transport direction, in the upstream direction from the reading unit 40 of the reading device 3 in the transport direction and vertically above the printing unit 10. Accordingly, as illustrated in FIG. 4, opening the cover 32 in the direction of an arrow B4 to thus facilitate maintenance of the printing unit 10.

Further, a print discharge paper cover 30 configured to be rotatable in the direction of an arrow B1 is provided about an upstream end serving as a rotation axis 29 in the downstream direction from the printing unit 10 in the transport direction. This allows, by opening the print discharge paper cover 30, the roll papers 21 and 21a having been printed to be placed on the print discharge paper cover 30, thus facilitating the recovery of the roll papers 21 and 21a after the completion of the printing. Further, when the printing operation is not performed, closing the print discharge paper cover 30 prevents entry of dust or debris, and allows the front face of the printing device 2 to be rendered flat, thus miniaturizing the multi-function printer 1 provided with the printing device 2.

In addition, the roll 20a including the roll support section 19a vertically below the roll support section 19, the roll paper 21a, the guide plate 22a, and the driving roller 23a are disposed on the drawer unit 15 configured to be movable along the transport direction at a position of printing by the printing unit 10. That is, the drawer unit 15 can be moved between a close position at which the roll support section 19a is located vertically below the reading unit 40 and an open position at which the roll support section 19a is located in the downstream direction from the reading unit 40 in the transport direction, as illustrated in FIG. 5. This allows, by causing the drawer unit 15 to move in the direction of an arrow C1 and causing the drawer unit 15 to move to the open position, the roll 20a around which the roll paper 21a is wound to be easily attached/detached, where the roll 20a is supported by the roll support section 19a.

Note that in the embodiment, the multi-function printer 1 provided with two pieces of the roll support sections 19 and 19a is described as an example, however, one piece of the roll support section may also be provided without being limited to the above.

In the embodiment, the paper 9 as the first medium, and the roll papers 21 and 21a as the second media are described as an example, however, the first medium may be the same as the second medium without being limited to the above.

The contents derived from the exemplary embodiments described above will be described below.

A multi-function printer includes a first transport roller provided in a path including a paper feeding port and a paper discharging port, the first transport roller being configured to transport a first medium, a second transport roller provided in a path different from the path provided with the first transport roller, the second transport roller being configured to transport a second medium, a reading unit configured to read a surface of the first medium that is transported by the first transport roller, a printing unit configured to perform printing onto the second medium that is transported by the second transport roller, a read controller configured to control the first transport roller and the reading unit, and a print controller configured to control the second transport roller and the printing unit, in which the first transport roller, the paper feeding port, the paper discharging port, and the reading unit are disposed in a downstream direction from the printing unit in a transport direction at a position of printing by the printing unit.

According to the above multi-function printer, the first transport roller, the paper feeding port, the paper discharging port, and the reading unit are disposed in a downstream direction from the printing unit in the transport direction at the printing position of the printing unit, that is, no constituent elements associated with the reading function are disposed vertically above the printing unit. This enhances the convenience of the user when performing maintenance on the printing unit.

The above-described multi-function printer may include a roll support section configured to support a roll around which the second medium to be fed to the printing unit is wound, in which the roll support section may be disposed in the direction downstream of the printing unit in the transport direction and vertically below the reading unit.

According to the above multi-function printer, the roll support section configured to support the roll around which the second medium is wound is disposed in the direction downstream of the printing unit in the transport direction and vertically below the reading unit, thus making it possible to shorten the size in the transport direction of the multi-function printer or in the direction in which the printing unit and the reading unit are aligned, and making it possible to miniaturize the multi-function printer.

In the above-described multi-function printer, the print controller may be disposed in a direction upstream of the roll support section in the transport direction and vertically below the printing unit.

According to the above multi-function printer, the print controller is disposed in a direction upstream of the roll support section in the transport direction and vertically below the printing unit, thus ensuring a space constituting the transport path to the printing unit of the second medium, and making it possible to miniaturize the multi-function printer.

The above-described multi-function printer may include a drawer unit configured to enable the roll support section to move in the transport direction, in which the drawer unit may be configured to be movable between a close position at which the roll support section is located vertically below the reading unit and an open position at which the roll support section is located in a downstream direction from the reading unit in the transport direction.

The above multi-function printer includes the drawer unit configured to enable the roll support section to move in the transport direction. This allows, by causing the drawer unit to move to the open position, the roll supported by the roll support section to be easily attached/detached.

In the above-described multi-function printer, the read controller may be disposed between the paper feeding port and the paper discharging port in a read transport direction at a position of reading by the reading unit.

According to the above multi-function printer, the read controller is disposed between the paper feeding port and the paper discharging port, thus making it possible to miniaturize the multi-function printer while ensuring the transport path to the reading unit of the first medium.

The above-described multi-function printer may include a cover in a direction upstream of the reading unit in the read transport direction and vertically above the position of printing by the printing unit, in which the cover may be configured to be rotatable about an upstream end thereof, which serves as a rotation axis, in the read transport direction.

According to the above multi-function printer, the cover is provided vertically above the printing position of the printing unit, thus making it possible to perform maintenance of the printing unit by opening and closing the cover.

What is claimed is:

1. A multi-function printer comprising:
   a first transport roller provided in a path including a paper feeding port and a paper discharging port, the first transport roller being configured to transport a first medium;
   a second transport roller provided in a path different from the path provided with the first transport roller, the second transport roller being configured to transport a second medium;
   a reading unit configured to read a surface of the first medium that is transported by the first transport roller;
   a printing unit configured to perform printing onto the second medium that is transported by the second transport roller;
   a read controller configured to control the first transport roller and the reading unit; and
   a print controller configured to control the second transport roller and the printing unit, wherein
   the first transport roller, the paper feeding port, the paper discharging port, and the reading unit are disposed in a downstream of the printing unit in a transport direction at a position of printing by the printing unit.

2. The multi-function printer according to claim 1, comprising a roll support section configured to support a roll, around which the second medium to be fed to the printing unit is wound, wherein
   the roll support section is disposed in the downstream direction from the printing unit in the transport direction and vertically below the reading unit.

3. The multi-function printer according to claim 2, wherein the print controller is disposed in an upstream direction from the roll support section in the transport direction and vertically below the printing unit.

4. The multi-function printer according to claim 2, comprising a drawer unit configured to move roll support section along the transport direction, wherein
   the drawer unit is configured to be movable between a close position at which the roll support section is located vertically below the reading unit and an open position at which the roll support section is located in a downstream direction from the reading unit in the transport direction.

5. The multi-function printer according to claim 1, wherein the read controller is disposed between the paper feeding port and the paper discharging port in a read transport direction at a position of reading by the reading unit.

6. The multi-function printer according to claim 5, comprising a cover in an upstream direction from the reading unit in the read transport direction and vertically above the position of printing by the printing unit, wherein
   the cover is configured to be rotatable about an upstream end thereof, which serves as a rotation axis, in the read transport direction.

* * * * *